3,598,603
SILVER HALIDE EMULSIONS WITH CYANINE DYES CONTAINING A 1-CYCLOHEXYL SUBSTITUTED PYROLE NUCLEUS
Derek D. Chapman, Rochester, N.Y., assignor to Eastman Kodak Company, Rochester, N.Y.
No Drawing. Filed Dec. 18, 1968, Ser. No. 784,904
Int. Cl. G03c 1/08; C09b 23/10
U.S. Cl. 96—130                23 Claims

ABSTRACT OF THE DISCLOSURE

Novel cyanine dyes which feature a 1-cyclohexyl substituted pyrole nucleus linked, by the 2- or 3-carbon atom thereof, to the methine chain of the dye, are useful sensitizers in photographic silver halide emulsions.

---

This invention relates to novel photographic materials, and more particularly to a new class of cyanine dyes, to novel photographic silver halide emulsions containing these dyes, and to new photographic elements prepared with such emulsions.

Cyanine dyes featuring a pyrrole nucleus linked, by the 2-carbon atom thereof to the methine chain of the dye are efficient spectral sensitizers for direct positive emulsions, as shown by Fumia and Heseltine in U.S. patent application Ser. No. 673,001, filed Oct. 5, 1967.

It is, accordingly, an object of this invention to provide cyanine dyes having a pyrrole nucleus.

Another object of this invention is to provide photographic silver halide emulsions containing a pyrrole dye.

Still another object of this invention is to provide pyrrole dyes which have good solubility.

Another object of this invention is to provide direct positive emulsions containing pyrrole dyes, which emulsions exhibit good stability.

Another object of this invention is to provide novel photographic elements comprising a support having thereon at least one layer containing a novel emulsion of this invention.

Another object of this invention is to provide methods for the preparation of pyrrole dyes.

Other objects will be apparent from this disclosure and the appended claims.

In accordance with one embodiment of this invention, cyanine dyes are provided comprising first and second 5- to 6-membered nitrogen containing nuclei joined by a methine linkage; the first of said nuclei being a 2-cyclohexyl substituted pyrole nucleus joined at the 2- or 3-carbon atom thereof to said linkage; and said second nucleus being a heterocyclic nucleus of the type used in cyanine dyes, to complete said cyanine dye.

In accordance with another embodiment of this invention, light-sensitive photographic silver halide emulsions are spectrally sensitized with cyanine dyes comprising first and second 5- to 6-membered nitrogen containing nuclei joined by a methine linkage; the first of said nuclei being a 1-cyclohexyl substituted pyrrole nucleus joined at the 2- or 3-carbon atom thereof to said linkage; and said second nucleus being a heterocyclic nucleus of the type used in cyanine dyes, to complete said cyanine dye. The dyes of this invention are particularly useful in direct positive photographic silver halide emulsions. Good results are obtained with direct positive emulsions containing dyes in which the 1-cyclohexylpyrrole nucleus is linked to the methine chain through either the 2- or 3-carbon atom of the pyrrole nucleus. This is unexpected since corresponding dyes which have a 1-alkyl or 1-aryl substituted pyrrole nucleus give substantially better results in direct positive emulsions when linked to the methine chain by the 2-carbon atom of the pyrrole nucleus.

The preferred cyanine dyes of the invention are represented by the following general formulas:

I.
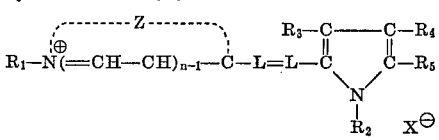

Ia.
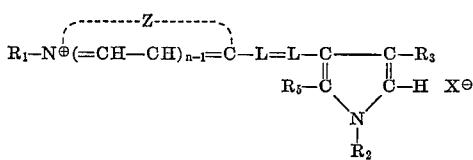

wherein $n$ represents a positive integer of from 1 to 2; L represents a methine linkage, e.g.—CH=, $$-C(CH_3)=$$

—$C(C_6H_5)$=, etc.; $R_1$ represents an alkyl group, including substituted alkyl (preferably a lower alkyl containing from 1 to 4 carbon atoms), e.g., methyl, ethyl, propyl, isopropyl, butyl, hexyl, cyclohexyl, decyl, dodecyl, etc., and substituted alkyl groups, (preferably a substituted lower alkyl containing from 1 to 4 carbon atoms), such as a hydroxyalkyl group, e.g., β-hydroxyethyl, ω-hydroxybutyl, etc., an alkoxyalkyl group, e.g., β-methoxyethyl, ω-butoxybutyl, etc., a carboxyalkyl group, e.g., β-carboxyethyl, ω-carboxybutyl, etc., a sulfoalkyl group, e.g., β-sulfoethyl, ω-sulfobutyl, etc., a sulfatoalkyl group, e.g., β-sulfatoethyl, ω-sulfatobutyl, etc., an acyloxyalkyl group, e.g., β-acetoxyethyl, γ-acetoxypropyl, ω-butyryloxybutyl, etc., an alkoxycarbonylalkyl group, e.g., β-methoxycarbonylethyl, ω-ethoxycarbonylbutyl, etc. or an aralkyl group, e.g., benzyl, phenethyl, etc.; an alkenyl group, e.g., allyl, 1-propenyl, 2-butenyl, etc., or an aryl group, e.g., phenyl, tolyl, naphthyl, methoxyphenyl, chlorophenyl, etc.; $R_2$ represents a cyclohexyl group, which can be substituted, for example, with alkyl such as methyl, ethyl, propyl or butyl, or halogen such as chloro or bromo; $R_3$, $R_4$ and $R_5$ each represents a hydrogen atom, an alkyl group (preferably a lower alkyl containing from 1 to 4 carbon atoms), e.g., methyl, ethyl, propyl, isopropyl, butyl, decyl, dodecyl, etc., or an aryl group, e.g., phenyl, tolyl, naphthyl, methoxyphenyl, chlorophenyl, nitrophenyl, etc., although $R_3$ and $R_5$ preferably represent phenyl and $R_4$ preferably represents hydrogen; X represents an acid anion, e.g., chloride, bromide, iodide, perchlorate, sulfamate, thiocyanate, p - toluenesulfonate, methyl, sulfate, etc.; and Z represents a nitrogen containing nucleus of the type used in the production of cyanine dyes, such as the non-metallic atoms necessary to complete a nucleus containing from 5 to 6 atoms in the heterocyclic ring, which nucleus may contain a second hetero atom such as oxygen, sulfur, selenium or nitrogen, such as the following representative nuclei: a thiazole nucleus, e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, benzothiazole, 4-chlorobenzothiazole, 4- or 5 - nitrobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 6 - nitrobenzothiazole, 5 - bromo-benzothiazole, 6-bromobenzothiazole, 5 - chloro-6 - nitrobenzothiazole, 4 - phenylbenzothiazole, 4 - methoxybenzothiazole, 5 - methoxybenzothiazole, 6 - methoxybenzothiazole, 5-iodobenzothiazole, 6-iodobenzothiazole, 4-ethoxybenzothiazole, 5 - ethoxybenzothiazole, tetrahydrobenzothiazole, 5,6 - dimethoxybenzothiazole, 5,6 - dioxymethylenebenzothiazole, 5-hydroxybenzothiazole, 6-hydroxybenzothiazole, α-naphthothiazole, β-naphthothiazole, β, β-naphthothiazole, 5 - methyl - β, β - naphthothiazole, 5-ethoxy - β - naphthothiazole, 8-methoxy - α - naphthothiazole, 7-methoxy - α - naphthothiazole, 4'-methoxythianaphtheno-7',6',4,5-thiazole, nitro group substituted naphthothiazoles, etc.; an oxazole nucleus, e.g., 4-methyloxazole, 4-nitro-oxazole, 5-methyloxazole, 4-phenyloxazole, 4,5 - diphenyloxazole, 4 - ethyloxazole, 4,5 - dimethazole, 5-phenyloxazole, benzoxazole, 5-chlorobenzoxazole, 5-methylbenzoxazole, 5-phenylbenzoxazole, 5- or 6-nitrobenzoxazole, 5-chloro-6-nitrobenzoxazole, 6-methylbenzoxazole, 5,6-dimethylbenzoxazole, 4,6-dimethylbenzoxazole, 5 - methoxybenzoxazole, 5 - ethoxybenzoxazole, 5-chlorobenzoxazole, 6 - methoxybenzoxazole, 5 - hydroxybenzoxazole, 6-hydroxybenzoxazole, α-naphthoxzole, β-naphthoxazole, nitro group substituted naphthoxazoles, etc.; a selenazole nucleus, e.g., 4-methylselenazole, 4-nitroselenazole, 4-phenylselenazole, benzoselenazole, 5-chlorobenzoselenazole, 5 - methoxybenzoselenazole, 5-hydroxybenzoselenazole, 5- or 6-nitrobenzoselenazole, 5-chloro-6-nitrobenzoselenazole, tetrahydrobenzoselenazole, α-naphthoselenazole, β - naphthoselenazole, nitro group substituted naphthoselenazoles, etc.; a thiazoline nucleus, e.g., thiazoline, 4-methylthiazoline, 4-nitrothiazoline, etc.; a pyridine nucleus, e.g., 2-pyridine, 5-methyl-2-pyridine, 4-pyridine, 3-methyl-4-pyridine, nitro group substituted pyridines, etc.; a quinoline nucleus, e.g., 2-quinoline, 3-methyl-2-quinoline, 5-ethyl-2-quinoline, 6-chloro-2-quinoline, 6-nitro-2-quinoline, 8-chloro-2-quinoline, 6-methoxy-2-quinoline, 8-ethoxy-2-quinoline, 8-hydroxy-2-quinoline, 4-quinoline, 6-methoxy-4-quinoline, 6-nitro-4-quinoline, 7-methyl-4-quinoline, 8-chloro-4-quinoline, 1 - isoquinoline, 6-nitro-1-isoquinoline, 3,4-dihydro-1-isoquinoline, 3-isoquinoline, etc.; a 3,3-dialkylindolenine nucleus, preferably having a nitro or cyano substituent, e.g., 3,3-dimethyl-5 or 6-nitroindolenine, 3,3-dimethyl-5- or 6-cyanoindolenine. etc.; and, an imidazole nucleus e.g., imidazole, 1-alkylimidazole, 1-alkyl-4-phenylimidazole, 1-alkyl-4,5-dimethylimidazole, benzimidazole, 1-alkylbenzimidazole, 1-alkyl-5-nitrobenzimidazole, 1-aryl-5,6 - dichlorobenzimidazole, 1-alkyl-α-naphthimidazole, 1-aryl - β - naphthimidazole, 1-alkyl-5-methoxy-α-naphthimidazole, or, an imidazo[4,5-b] quinoxaline nucleus, e.g., 1,3 - dialkylimidazo[4,5 - b] quinoxaline such as 1,3-diethylimidazo[4,5-b]quinoxaline, dialkenylimidazo[4,5-b]quinoxaline such as 1,3-diallylimidazo[4,5-b]quinoxaline, 6-chloro-1,3 - diallylimidazo [4,5-b]quinoxaline, etc., 1,3-diarylimidazo[4,5-b] quinoxaline such as 1,3-diallylimidazo[4,5-b]quinoxaline, 6-chloro-1,3-diallylimidazo[4,5-b]quinoxaline, etc., 1,3-diarylimidazo [4,5 - b]quinoxaline such as 1,3 - diphenylimidazo[4,5-b]quinoxaline, 6-chloro-1,3-diphenylimidazo [4,5-b]quinoxaline, etc.; a 3,3-dialkyl-3H-pyrrolo[2,3-b] pyridine nucleus e.g., 3,3-dimethyl - 3H - pyrrolo[2,3 - b] pyridine, 3,3-diethyl-3H-pyrrolo[2,3 - b]pyridine, etc.; a thiazolo[4,5-b]quinoline nucleus; and the like. Nuclei wherein Z completes an imidazo[4,5-b]quinoxaline nucleus, or a nitro group substituted thiazole, oxazole, selenazole, thiazoline, pyridine, quinoline, indole, or imidazole nucleus are desensitizing nuclei. Dyes of the invention produced with these desensitizing nuclei are the preferred dye species of the invention.

The novel cyanine dyes of the invention defined above are powerful electron acceptors and spectral sensitizers for direct positive photographic silver halide emulsions. In addition, they are also useful desensitizers in emulsions used in the process described in Stewart and Reeves, U.S. Patent No. 3,250,618, issued May 10, 1966.

As used herein "desensitizing nucleus" refers to those nuclei which, when converted to a symmetrical carbocyanine dye and added to gelatin silver chorobromide emulsion containing 40 mole percent chloride and 60 mole percent bromide, at a concentration of from 0.01 to 0.2 gram dye per mole of silver, causes by electron trapping at least about an 80 percent loss in the blue speed of the emulsion when sensitometrically exposed and developed three minutes in Kodak developer D–19 at room temperature. Advantageously, the desensitizing nuclei are those which, when converted to a symmetrical carbocyanine dye and tested as just described, essentially completely desensitize the test emulsion to blue radiation (i.e., cause more than about 90 to 95% loss of speed to blue radiation.

The cyanine dyes defined by Formulas I and Ia above are conveniently prepared, for example, by reacting at from 15° C. to refluxing temperatures a mixture of (1) a heterocyclic compound of the formula:

II.  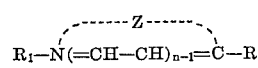

wherein $n$, $R_1$, X and Z are as previously defined, and R represents methyl, ethyl, benzyl, etc., and (2) a pyrrole compound of the formula:

III. 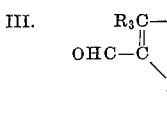   IIIa. 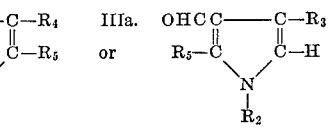

wherein $R_2$, $R_3$, $R_4$ and $R_5$ are as previously defined, in approximately equimolar proportions, in the presence or absence, as desired, of a condensing agent such as a trialkylamine, e.g., triethylamine, etc., piperidine, N-methylpiperidine, etc., in an inert solvent medium such as an alkanol, e.g., ethanol, or acetic anhydride. Chain-substituted dyes are prepared when R represents ethyl, benzyl etc. The crude dyes are then separated from the reaction mixtures and purified by one or more recrystallizations from appropriate solvents such as methanol, mixtures of dimethylacetamide and methanol, and the like.

The intermediate compounds of Formula III and IIIa above are conveniently prepared, for example, by reacting a mixture of approximately equimolar amounts of (1) a compound of the formula:

IV. 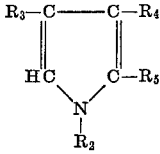

wherein $R_2$, $R_3$, $R_4$ and $R_5$ are as previously defined, and (2) an N,N-dimethylformamide/phosphoryl chloride complex, in a solvent medium such as dichloroethane. Preferably (2) is agitated with the dichloroethane and the pyrrole compound (1) is slowly added thereto in the form of a solution thereof in dichloroethane, at the temperature of an ice bath. The mixture is then heated to reflux for a short period, cooled, and an aqueous solution of sodium acetate is then added. After further refluxing, the crude product is separated by appropriate decantation and extraction methods and recrystallized from a suitable solvent such as ligroin. A mixture of compounds III and IIIa are obtained. Blocking groups, e.g., alkyl groups, can be utilized in $R_4$ in Formula IV to obtain intermediates of Formula III to the exclusion of those of Formula IIIa.

Compound IV can be prepared by the following reaction:

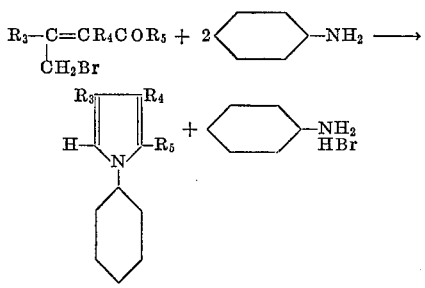

wherein $R_3$, $R_4$ and $R_5$ have the meanings given above.

In accordance with the invention, novel and improved direct positive photographic silver halide emulsions are prepared by incorporating one or more of the cyanine dyes of the invention into a suitable fogged silver halide emulsion. The emulsion can be fogged in any suitable manner, such as by light or with chemical fogging agents, e.g., stannous chloride, formaldehyde, thiourea dioxide, and the like. The emulsion may be fogged by the addition thereto of a reducing agent, such as thiourea dioxide, and a compound of a metal more electropositive than silver, such as a gold salt, for example, potassium chloroaurate, as described in British Pat. 723,019 (1955).

Typical reducing agents that are useful in providing such emulsions include stannous salts, e.g., stannous chloride, hydrazine, sulfur compounds such as thiourea dioxide, phosphonium salts such as tetra(hydroxymethyl) phosphonium chloride, and the like. Typical useful metal compounds that are more electropositive than silver include gold, rhodium, platinum, palladium, iridium, etc., preferably in the form of soluble salts thereof, e.g., potassium chloroaurate, auric chloride, $(NH_4)_2PdCl_6$ and the like.

Useful concentrations of reducing agent and metal compound (e.g., metal salt) can be varied over a considerable range. As a general guideline, good results are obtained using about .05 to 40 mg. reducing agent per mole of silver halide and 0.5 to 15.0 mg. metal compound per mole of silver halide. Best results are obtained at lower concentration levels of both reducing agent and metal compound.

The concentration of added dye can vary widely, e.g., from about 50 to 2000 mg. and preferably from about 400 to 800 mg. per mole of silver halide in the direct positive emulsions.

As used herein, and in the appended claims, "fogged" refers to emulsions containing silver halide grains which produce a density of at least 0.5 when developed, without exposure, for 5 minutes at 68° F. in developer Kodak DK–50 having the composition set forth below, when the emulsion is coated at a silver coverage of 50 mg. to 500 mg. per square foot.

Developer: G.
  N-methyl-p-aminophenol sulfate _____ 2.5
  Sodium sulfite (anhydrous) _____ 30.0
  Hydroquinone _____ 2.5
  Sodium metaborate _____ 10.0
  Potassium bromide _____ 0.5
  Water to make 1.0 l.

The dyes of this invention are also advantageously incorporated in direct positive emulsions of the type in which a silver halide grain has a water-insoluble silver salt center and an outer shell composed of a fogged water-insoluble silver salt that develops to silver without exposure. The dyes of the invention are incorporated, preferably, in the outer shell of such emulsions. These emulsions can be prepared in various ways, such as those described in Berriman U.S. Pat. 3,367,778 issued Feb. 6, 1968. For example, the shell of the grains in such emulsions may be prepared by precipitating over the core grains a light-sensitive water-insoluble silver salt that can be fogged and which fog is removable by bleaching. The shell is of sufficient thickness to prevent access of the developer used in processing the emulsions of the invention to the core. The silver salt shell is surface fogged to make it developable to metallic silver with conventional surface image developing compositions. The silver salt of the shell is sufficiently fogged to produce a density of at least about 0.5 when developed for 6 minutes at 68° F. in Developer A below when the emulsion is coated at a silver coverage of 100 mg. per square foot. Such fogging can be effected by chemically sensitizing to fog with the sensitizing agents described for chemically sensitizing the core emulsion, high intensity light and the like fogging means well known to those skilled in the art. While the core need not be sensitized to fog, the shell is fogged. Fogging by means of a reduction sensitizer, a noble metal salt such as gold salt plus a reduction sensitizer, a sulfur sensitizer, high pH and low pAg silver halide precipitating conditions, and the like can be suitably utilized. The shell portion of the subject grains can also be coated prior to fogging.

Developer A: G.
  N-methyl-p-aminophenol sulfate _____ 2.5
  Ascorbic acid _____ 10.0
  Potassium metaborate _____ 35.0
  Potassium bromide _____ 1.0
  Water to 1 liter.
  pH of 9.6

Before the shell of water-insoluble silver salt is added to the silver salt core, the core emulsion is first chemically or physically treated by methods previously described in the prior art to produce centers which promote the deposition of photolytic silver, i.e., latent image nucleating centers. Such centers can be obtained by various techniques as described herein. Chemical sensitization techniques of the type described by Antoine Hautot and Henri Sauvenier in Science et Industries Photographiques, Vol. XXVIIII, January 1957, pages 1 to 23 and January 1957, pages 57 to 65 are particularly useful. Such chemical sensitization includes three major classes, namely, gold or noble metal sensitization, sulfur sensitization, such as by a labile sulfur compound, and reduction sensitization, e.g., treatment of the silver halide with a strong reducing agent which introduces small specks of metallic silver into the silver salt crystal or grain.

The dyes of this invention are highly useful electron acceptors in high speed direct positive emulsions comprising fogged silver halide grains and a compound which accepts electrons, as described and claimed in Illingsworth U.S. patent application Ser. No. 619,936, filed Mar. 2, 1967, now U.S. Pat. 3,501,307 issued Mar. 17, 1970 and Belgian Patent. 695,366 of Sept. 11, 1967. The fogged silver halide grains of such emulsions are such that a test portion thereof, when coated as a photographic silver halide emulsion on a support to give a maximum density of at least about one upon processing for six minutes at about 68° F. in Kodak DK–50 developer, has a maximum density which is at least about 30% greater than the maximum density of an identical coated test portion which is processed for six minutes at about 68° F. in Kodak DK–50 developer after being bleached for about 10 minutes at about 68° F. in a bleach composition of:

potassium cyanide—50 mg.
acetic acid (glacial)—3.47 cc.
sodium acetate—11.49 g.
potassium bromide—119 mg.
water to 1 liter.

The grains of such emulsions will lose at least about 25% and generally at least about 40% of their fog when bleached for ten minutes at 68° F. in a potassium cyanide bleach composition as described herein. This fog loss can be illustrated by coating the silver halide grains as a photographic silver halide emulsion on a support to give a maximum density of at least 1.0 upon processing for six minutes at about 68° F. in Kodak DK–50 developer and comparing the density of such a coating with an identical coating which is processed for six minutes at 68° F. in Kodak DK–50 developer after being bleached for about 10 minutes at 68° F. in the potassium cyanide bleach composition. As already indicated, the maximum density of the unbleached coating will be at least 30% greater, generally at least 60% greater, than the maximum density of the bleached coating.

The silver halides employed in the preparation of the photographic emulsions emulsions useful herein include any of the photographic silver halides as exemplified by silver bromide, silver iodide, silver chloride, silver chlorobromide, silver bromoiodide, silver chlorobromoiodide, and the like. Silver halide grains having an average grain size less than about one micron, preferably less than about 0.5 micron, give particularly good results. The silver halide grains can be regular and can be any suitable shape such as cubic or octahedral, as described and claimed in Illingsworth U.S. patent application Ser. No. 619,909, filed Mar. 2, 1967, now U.S. Patent 3,501,306 issued Mar. 17, 1970 and Belgian Patent 695,366 of Sept. 11, 1967. Such grains advantageously have a rather uniform diameter frequency distribution, as described and claimed in Illingsworth U.S. patent application Ser. No. 619,948, filed Mar. 2, 1967, now U.S. Patent 3,501,305 issued Mar. 17, 1970 and Belgian Patent 695,366 of Sept. 11, 1967. For example, at least 95%, by weight, of the photographic silver halide grains can have a diameter which is within about 40%, preferably within about 30% of the mean grain diameter. Mean grain diameter, i.e., average grain size, can be determined using conventional methods, e.g., as shown in an article by Trivelli and Smith entitled "Empirical Relations Between Sensitometric and Size-Frequency Characteristics in Photographic Emulsion Series" in The Photographic Journal, vol. LXXIX, 1949, pages 330–338. The fogged silver halide grains in these direct-positive photographic emulsions of this invention produce a density of at least 0.5 when developed without exposure for five minutes at 68° F. in Kodak DK–50 developer when such an emulsion is coated at a coverage of 50 to about 500 mg. of silver per square foot of support. The preferred photographic silver halide emulsions comprise at least 50 mole percent bromide, the most preferred emulsions being silver bromoiodide emulsions, particularly those containing less than about ten mole percent iodide. The photographic silver halides can be coated at silver coverages in the range of about 50 to about 500 milligrams of silver per square foot of support.

In the preparation of the above photographic emulsions, the dyes of the invention are advantageously incorporated in the washed, finshed silver halide emulsion and should, of course, be uniformly distributed throughout the emulsion. The methods of incorporating dyes and other addenda in emulsions are relatively simple and well known to those skilled in the art of emulsion making. For example, it is convenient to add them from solutions in appropriate solvents, in which case the solvent selected should be completely free from any deleterious effect on the ultimate light-sensitive materials. Methanol, isopropanol, pyridine, water, etc., alone or in admixtures, have proven satisfactory as solvents for this purpose. The type of silver halide emulsions that can be sensitized with the new dyes include any of these prepared with hydrophilic colloids that are known to be satisfactory for dispersing silver halides, for example, emulsions comprising natural materials such as gelatin, albumin, agar-agar, gum arabic, alginic acid, etc. and hydrophilic synthetic resins such s alginic acid, etc. and hydrophilic synthetic resins such as polyvinyl alcohol, polyvinyl pyrrolidone, cellulose ethers partially hydrolyzed cellulose acetate, and the like.

The binding agents for the emulsion layer of the photographic element can also contain dispersed polymerized vinyl compounds. Such compounds are disclosed, for example, in U.S. Patents 3,142,568; 3,193,386; 3,062,674 and 3,220,844 and include the water insoluble polymers of alkyl acrylates and methacrylates, acrylic acid, sulfoalkyl acrylates or methacrylates and the like.

The dyes, reducing agents and metal compounds of the invention can be used with emulsions prepared, as indicated above, with any of the light-sensitive silver halide salts including silver chloride, silver bromide, silver chlorobromide, silver bromoiodide, silver chlorobromiodide, etc. Particularly useful are direct positive fogged emulsions in which the silver salt is a silver bromohalide comprising more than 50 mole percent bromide. Certain dyes of this invention are also useful in emulsions which contain color formers.

The novel emulsions of this invention may be coated on any suitable photographic support, such as glass, film base such as cellulose acetate, cellulose acetate butyrate, polyesters such as poly(ethylene terephthalate), paper baryta coated paper, polyolefin coated paper, e.g., polyethylene or polypropylene coated paper, which may be electron bombarded to promote emulsion adhesion, to produce the novel photographic elements of the invention.

The photographic silver halide emulsion and other layers present in the photographic elements made according to the invention can be hardened with any suitable hardener, including aldehyde hardeners such as formaldehyde, and mucochloric acid, aziridine hardeners, hardeners which are derivatives of dioxane, oxypolysaccharides such as oxy starch or oxy plant gums, and the like. The emulsion layers can also contain additional additives, particularly those known to be beneficial in photographic emulsions, including, for example, lubricating materials, stabilizers, speed increasing materials, absorbing dyes, plasticizers, and the like. These photographic emulsions can also contain in some cases additional spectral sensitizing dyes. Furthermore, these emulsions can contain color forming couplers or can be developed in solutions containing couplers or other color generating materials. Among the useful color formers are the monomeric and polymeric color formers, e.g., pyrazolone color formers, as well as phenolic, heterocyclic and open chain couplers having a reactive methylene group. The color forming couplers can be incorporated into the direct positive photographic silver halide emulsion using any suitable technique, e.g., techniques of the type shown in Jelley et al., U.S. Pat. 2,322,027, issued June 15, 1943, Fierke et al., U.S. Pat. 2,801,171, issued July 30, 1957, Fisher U.S. Pats. 1,055,155 and 1,102,028, issued Mar. 4, 1913 and June 30, 1914, respectively, and Wilmanns U.S. Pat. 2,186,849 issued Jan. 9, 1940. They can also be developed using incorporated developers such as polyhydroxybenzenes, aminophenols, 3-pyrazolidones, and the like.

The following examples are included for a further understanding of this invention.

EXAMPLE 1

2-[2-(1-cyclohexyl-3,5-diphenyl - 2 - pyrrolyl)vinyl]-1,3-diethyl - imidazo[4,5-b]quinoxalinium perchlorate I, X=ClO$_4$

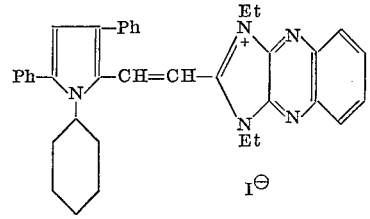

1-cyclohexyl-3,5-diphenylpyrrole - 2 - carboxaldehyde (1.09 g., 0.003 mole) and 1,3-diethyl-2-methylimidazo [4,5-b]quinoxalinium p-toluenesulfonate (1.37 g., 0.003 mole) in acetic anhydride (5 ml.) is heated to boiling for one minute. The cooled solution is poured into water (50 ml.) containing sodium perchlorate (1 g.). Ether (150 ml.) is added and after stirring for 30 minutes, the precipitated dye is filtered off. After two recrystallizations from ethanol the yield of purified dye is 0.6 g. (28%), M.P. 227–228° dec.

*Analysis.*—Calcd. for $C_{37}H_{38}N_5ClO_4$ (percent): C, 68.2; H, 5.9; N, 10.8. Found (percent): C, 68.0; H, 5.9; N, 10.6.

EXAMPLE 2

2-[22-(1-cyclohexyl-3,5-diphenyl-2-pyrrolyl)vinyl]-1,3,3-trimethyl-5-nitro-3H-indolium p-toluenesulfonate (PTS)

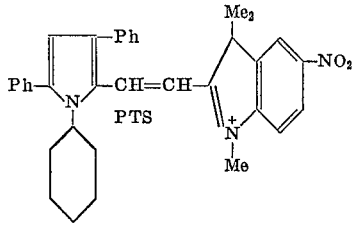

This dye is prepared in the manner described in Example 1 except that 1,2,3,3,-tetramethyl-5-nitro-3H-indolium p-toluenesulfonate (1.3 g., 0.003 mole) is used in place of the 1,3-diethyl-2-methylimidazo[4,5-b]quinoxalinium p-toluenesulfonate. After two recrystallizations from isopropyl alcohol the yield of pure dye is 1.8 g. (75%); M.P. 200–201° dec.

*Analysis.*—Calcd. for $C_{42}H_{43}N_3SO_5$ (percent): C, 71.9; H, 6.2; N, 5.9. Found (percent): C, 71.9; H, 6.4; N, 5.8.

EXAMPLE 3

2-[2-(1-cyclohexyl-3,5-diphenyl-2-pyrrolyl)vinyl]-1,3,3-trimethyl-3H-pyrrolo[2,3-b]pyridinium perchlorate

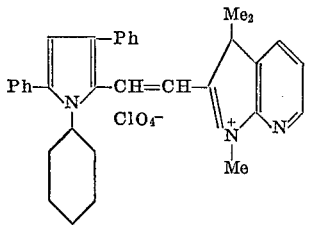

This dye is prepared in the manner described in Example 1 except that a mixture of 1,2-dihydro-1,3,3-trimethyl-2-methylenepyrrolo[2,3-b]pyridine (0.58 g., 0.003 mole) and p-toluenesulfonic acid monohydrate (0.65 g.) is used in place of the 1,3-diethyl-2-methylimidazo[4,5-b]quinoxalinium p-toluenesulfonate. After two recrystallizations from ethanol the yield of purified dye is 1.1 g. (53%) M.P. 188–189° dec.

*Analysis.*—Calcd. for $C_{34}H_{36}N_3ClO_4$ (percent): C, 69.7; H, 6.2; N, 7.2. Found (percent): C, 69.8; H, 61; N, 6.7.

EXAMPLE 4

2-[2-(1-cyclohexyl-3,5-diphenyl-2-pyrrolyl)vinyl]-3-ethyl-6-nitrobenzothiazolium p-toluenesulfonate

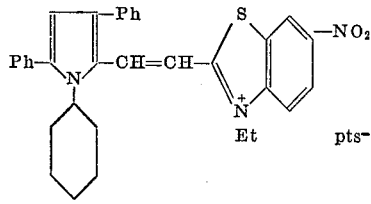

1 - cyclohexyl - 3,5 - diphenylpyrrole - 2 - carboxaldehyde (1.64 g., 0.005 mole) and 3-ethyl-2-methyl-6-nitrobenzthiazolium p-toluenesulfonate (1.95 g., 0.005 mole) in acetic anhydride (15 ml.) are heated to boiling for one minute. The cooled solution is diluted with ether and the precipitated dye is collected by filtration. After three recrystallizations from isopropyl alcohol the yield of purified dye is 1.5 g. (42%), M.P. 210° dec. (shrinks at 130°).

*Analysis.*—Calcd. for $C_{40}H_{39}N_2S_2O_5$ (percent): C, 66.3; H, 5.4; N, 5.8. Found (percent): C, 66.3; H, 5.1; N, 5.6.

EXAMPLE 5

2-[2-(1-cyclohexyl-2,4-diphenyl-3-pyrrolyl)vinyl]-1,3-dithylimidazo[4,5-b]quinoxalinium perchlorate 1 - cyclohexyl - 2,4 - diphenylpyrrole - 3 - carboxaldehyde (0.72 g., 0.0025 mole) and 1,3-diethyl-2-methylimidazo[4,5-b]quinoxalinium p- toluenesulfonate (0.6 g., 0.0025 mole) are allowed to react in the manner described in Example 1. After two recrystallizations from methanol the yield of purified dye is 0.6 g. (50%), M.P. 309–311° dec.

*Analysis.*—Calcd. for $C_{37}H_{38}N_5ClO_4$ (percent): C, 68.2; H, 5.9; N, 10.8. Found (percent): C, 67.9; H, 5.9; N, 10.9.

EXAMPLE 6

2-[2-(1-cyclohexyl-2,4-diphenyl-3-pyrrolyl)vinyl]-1,3,3-trimethyl-5-nitro-3H-indolium perchlorate

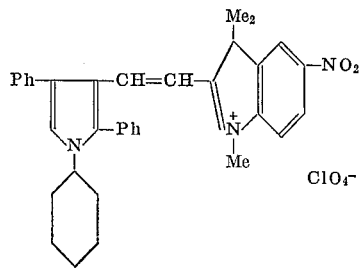

This dye is prepared as described in Example 5 except 1,2,3,3 - tetramethyl - 5 - nitro-3H-indolium p-toluenesulfonate (0.6 g., 0.0025 mole) is used in place of the 1,3-diethyl - 2 - methylimidazo[4,5-b]quinoxalinium p-toluenesulfonate. After two recrystallizations from methanol the yield of purified dye is 0.7 g. (61%), M.P. 286–288° dec.

*Analysis.*—Calcd. for (percent): C, 66.7; H, 5.8; N, 6.7. Found (percent): C, 66.9; H, 5.7; N, 7.0.

EXAMPLE 7

1-cyclohexyl - 2,4 - diphenylpyrrole is prepared by the method described by Cromwell et al. Tetrahedron Letters, 30, 2859 (1967).

EXAMPLE 8

1 - cyclohexyl - 3,5 - diphenylpyrrole - 2 - carbonaldehyde 1-cyclohexyl-2,4-diphenylpyrrole-3-carboxaldehyde 1 - cyclohexyl - 2,4 - diphenylpyrrole (7 g.) is added to phosphoryl chloride (3.5 g.) in dimethylformamide (100 ml.) and the reaction mixture heated on the steam bath for 45 minutes. The reaction mixture is poured onto ice and 10% sodium hydroxide (50 ml.) is added. The mixture is heated on the steam bath for ten minutes. The product is isolated from the cooled solution by filtration. The crude product is dissolved in the minimum volume of chloroform and chromatographed on a column of neutral alumina (Woelm Act. I, 200 g.). Elution with a mixture of ligroin/chloroform 9:1 gives the 2-aldehyde 4.4 g. (58%), M.P. 124–125.5° after recrystallization from ethanol. Elution with ligroin/chloroform 3:1 gives a mixture of the 2- and 3-aldehydes and elution with chloroform gives the pure 3-aldehyde 1.4 g. (19%), M.P. 161–162° after recrystallization from methanol.

It will be apparent from the foregoing examples that other cyanine dyes of this invention can be prepared which have generally similar properties. Such related dyes which are included within the scope of this invention are, for example:

2-[2-(1-cyclohexyl-3,4-5-trimethyl-2-pyrrolyl)vinyl]-1,3-diallylimidazo[4,5-b]quinoxalinium perchlorate
2-[2-(3,5-butyl-1-cyclohexyl-4-phenyl-2-pyrrolyl)-vinyl]-1,3-diethylimidazo[4,5-b]quinoxalinium perchlorate 2-[2-(1-cyclohexyl-2-pyrrolyl)vinyl]-3-ethyl-6-nitro-benzothiazolium p-toluenesulfonate 2-[2-(1-cyclohexyl-2,4-dimethyl-3-pyrrolyl)vinyl]-3-ethyl-5-nitrobenzoselenazolium p-toluenesulfonate 2-[2-(1-cyclohexy-3-pyrrolyl)vinyl]-1,3-diphenylimidazo[4,5-b]quinoxalinium perchlorate 2-[2-(1-cyclohexyl-2-methyl-4-phenyl-3-pyrroloyl)-vinyl]-1,3,3-trimethyl-3H-pyrrole[2,3-b]pyridinium perchlorate 2-[2-(1-cyclohexyl-5-methyl-3-phenyl-2-pyrrolyl)-vinyl]-3-ethyl-5-nitrobenzoxazolium p-toluenesulfonate Dyes in accordance with this invention are tested photographically by adding the dye, in the concentrations shown in Table I below, to a direct positive emulsion comprising grains having a central core of a water-insoluble silver salt containing centers which promote the deposition of photolytic silver, and an outer shell comprising a fogged or spontaneously developable water-insoluble silver salt, having the same composition as that of Example 1 of Berriman U.S. Patent 3,367,778, isssued Feb. 6, 1968. The emulsions are held at 40° C. for 10 minutes, and then coated on a cellulose acetate film support, chill set and dried. The films are exposed on a sensitometer by a continuous step wedge, developed for 6 minutes at 20° C. in Kodak developer DK-19 fixed, washed and dried with the following results:

TABLE I

| Dye of example No. | Conc., mg./mole Ag | Relative clear speed | $D_{max.}$ | $D_{min.}$ | Sensitizing maximum |
|---|---|---|---|---|---|
| 1 | 350 | 646 | 1.68 | .04 | 570 |
| 2 | 350 | 575 | 1.76 | .04 | 600 |
| 3 | 350 | 617 | 1.73 | .04 | 570 |
| 4 | 250 | 380 | 1.76 | .05 | 580 |
| 5 | 350 | 562 | 1.74 | .04 | 510 |
| 6 | 350 | 398 | 1.75 | .04 | 525 |

The invention has been described in detail with particular reference to preferred embodiments thereof, but, it will be understood that variations and modifications can be effected within the spirit and scope of the invention.

I claim:

1. A photographic silver halide emulsion containing a cyanine dye comprising first and second 5- to 6-membered nitrogen containing heterocyclic nuclei joined by a methine linkage; the first of said nuclei being a 1-cyclohexyl substituted pyrrole nucleus joined at the 2- or the 3-carbon atom thereof to said linkage; and said second nucleus being a desensitizing nucleus.

2. A photographic silver halide emulsion containing a cyanine dye having one of the following formulas:

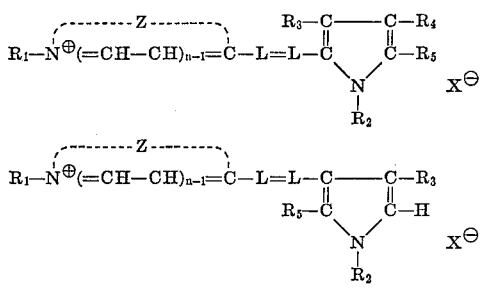

wherein $n$ represents a positive integer of from 1 to 2; L represents a methine linkage; $R_1$ represents a member selected from the group consisting of an alkyl group, an alkenyl group and an aryl group; $R_2$ represents a cyclohexyl group; $R_3$, $R_4$ and $R_5$ each represents a member selected from the group consisting of a hydrogen atom, an alkyl group, and an aryl group; X represents an acid anion; and Z represents the non-metallic atoms required to complete a 5- to 6-membered nitrogen containing desensitizing nucleus.

3. A photographic silver halide emulsion containing a cyanine dye selected from the group consisting of:

2-[2-(1-cyclohexyl-3,5-diphenyl-2-pyrrolyl)vinyl]-1,3-diethylimidazo[4,5-b]quinoxalinium salt 2-[2-(1-cyclohexyl-3,5-diphenyl-2-pyrrolyl)-vinyl]-1,3,3-trimethyl-5-nitro-3H-indolium salt 2-[2-(1-cyclohexyl-3,5-diphenyl-2-pyrrolyl)-vinyl]-1,3,3-trimethyl-3H-pyrrolo[2,3-b]pyridinium salt 2-[2-(1-cyclohexyl-3,5-diphenyl-2-pyrrolyl)-vinyl]-3-ethyl-6-nitrobenzothiazolium salt 2-[2-(1-cyclohexyl-2,4-diphenyl-3-pyrrolyl)vinyl]-1,3-diethylimidazo[4,5-b]quinoxalinium salt 2-[2-(1-cyclohexyl-2,4-diphenyl-3-pyrrolyl)vinyl]1,3,3-trimethyl-5-nitro-3H-indolium salt.

4. A fogged direct positive photographic silver halide emulsion containing at least one cyanine dye selected from those comprising first and second 5- to 6-membered nitrogen containing heterocyclic nuclei joined by a methine linkage; the first of said nuclei being a 1-cycloalkyl substituted pyrrole nucleus joined at the 2- or 3-carbon atom thereof to said linkage; and said second nucleus being a desensitizing nucleus.

5. A direct positive emulsion in accordance with claim 4 wherein said cyanine dye contains a nitro substituted desensitizing nucleus.

6. A direct positive emulsion in accordance with claim 4 wherein said cyanine dye contains an imidazo[4,5-b]-quinoxaline disensitizing nucleus.

7. A direct positive emulsion in accordance with claim 4 in which the said silver halide is present in the form of fogged halide grains.

8. A fogged direct positive photographic silver halide emulsion containing at least one cyanine dye selected from those represented by the following formulas:

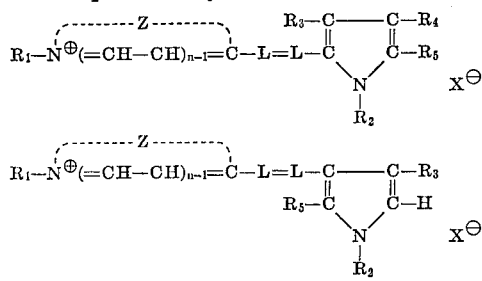

wherein $n$ represents a positive integer of from 1 to 2; L represents a methine linkage; $R_1$ represents a member selected from the group consisting of an alkyl group, an alkenyl group and an aryl group; $R_2$ represents a cyclohexyl group; $R_3$, $R_4$ and $R_5$ each represents a member selected from the group consisting of a hydrogen atom, an alkyl group, and an aryl group; X represents an acid anion; and Z represents the non-metallic atoms required to complete a 5- to 6-membered nitrogen containing desensitizing nucleus.

9. A direct positive emulsion in accordance with claim 8 wherein said Z represents the non-metallic atoms required to complete a nitrobenzothiazole nucleus.

10. A direct positive emulsion in accordance with claim 8 wherein said Z represents the non-metallic atoms required to complete an imidazo[4,5-b]quinoxaline nucleus.

11. A direct positive emulsion in accordance with claim 8 wherein said Z represents the non-metallic atoms required to complete a 3,3-dialkyl-3H-nitroindole nucleus.

12. A direct positive emulsion in accordance with claim 8 in which the said silver halide is present in the form of chemically fogged silver halide grains.

13. A fogged direct positive photographic silver halide emulsion containing a cyanine dye selected from the group consisting of:

2-[2-(1-cyclohexyl-3,5-diphenyl-2-pyrrolyl)vinyl]-1,3-diethylimidazo[4,5-b]quinoxalinium salt 2-[2-(1-cyclohexyl-3,5-diphenyl-2-pyrrolyl)vinyl]-1,3,3-trimethyl-5-nitro-3H-indolium salt 2-[2-(1-cyclohexyl-3,5-diphenyl-2-pyrrolyl)vinyl]-1,3,3-trimethyl-3H-pyrrolo[2,3-b]pyridinium salt 2-[2-(1-cyclohexyl-3,5-diphenyl-2-pyrrolyl)vinyl]-3-ethyl-6-nitrobenzothiazolium salt 2-[2-(1-cyclohexyl-2,4-diphenyl-3-pyrrolyl)vinyl]-1,3-diethylimidazo[4,5-b]quinoxalinium salt 2-[2-(1-cyclohexyl-2,4-diphenyl-3-pyrrolyl)vinyl]-1,3,3-trimethyl-5-nitro-3H-indolium salt.

14. A fogged direct positive photographic silver halide emulsion containing 2-[2-(1-cyclohexyl-3,5-diphenyl-2-pyrrolyl)vinyl]-1,3-diethylimidazo[4,5-b]quinoxalinium salt.

15. A fogged direct positive photographic silver halide emulsion containing 2-[2-(1-cyclohexyl-3,5-diphenyl-2-pyrrolo)vinyl]-1,3,3-trimethyl-3H-pyrrolo[2,3-b]pyridinium salt.

16. A fogged direct positive photographic silver halide emulsion containing 2-[2-(1-cyclohexyl-2,4-diphenyl-3-pyrrolo)vinyl]-1,3-diethylimidazo[4,5-b]quinoxalinium salt.

17. A direct positive photographic emulsion comprising grains having a water-insoluble silver salt center, and outer shell composed of a fogged water-insoluble silver salt that develops to silver without exposure, said emulsion containing a cyanine dye comprising first and second 5- to 6-membered nitrogen containing heterocyclic nuclei joined by a methine linkage; the first of said nuclei being a 1-cyclohexyl substituted pyrrole nucleus joined at the 2- or the 3-carbon atom thereof to said linkage; and said second nucleus being a desensitizing nucleus.

18. A direct positive photographic emulsion comprising grains having a water-insoluble silver salt center, and an outer shell composed of a fogged water-insoluble silver salt that develops to silver without exposure, said emulsion containing a cyanine dye having one of the following formulas:

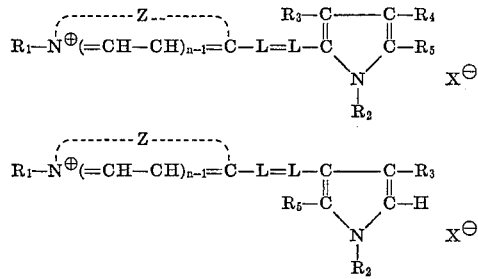

wherein $n$ represents a positive integer of from 1 to 2; L represents a methine linkage; $R_1$ represents a member selected from the group consisting of an alkyl group, an alkenyl group and an aryl group; $R_2$ represents a cyclohexyl group; $R_3$, $R_4$ and $R_5$ each represents a member selected from the group consisting of a hydrogen atom, an alkyl group, and an aryl group; X represents an acid anion; and Z represents the non-metallic atoms required to complete a 5- to 6-membered nitrogen containing desensitizing nucleus.

19. A direct positive photographic emulsion comprising grains having a water-insoluble silver salt center, and an outer shell composed of a fogged water-insoluble silver salt that develops to silver without exposure, said emulsion containing a cyanine dye selected from the group consisting of:

2-[2-(1-cyclohexyl-3,5-diphenyl-2-pyrrolyl)vinyl]-1,3-dimethylimidazo[4,5-b]quinoxalinium salt 2-[2-(1-cyclohexyl-3,5-diphenyl-2-pyrrolyl)vinyl]1,3,3-trimethyl-5-nitro-3H-indolium salt 2-[2-(1-cyclohexyl-3,5-diphenyl-2-pyrrolyl)vinyl]-1,3,3-trimethyl-3H-pyrrolo[2,3-b]pyridinium salt 2-[2-(1-cyclohexyl-3,5-diphenyl-2-pyrrolyl)vinyl]-3-ethyl-6-nitrobenzothiazolium salt 2-[2-(1-cyclohexyl-2,4-diphenyl-3-pyrrolyl)vinyl]-1,3-diethylimidazo[4,5-b]quinoxalinium salt 2-[2-(1-cyclohexyl-2,4-diphenyl-3-pyrrolyl)vinyl]-1,3,3-trimethyl-5-nitro-3H-indolium salt.

20. A direct positive photographic emulsion comprising grains having a water-insoluble silver salt center, and an outer shell composed of a fogged water-insoluble silver salt that develops to silver without exposure, said emulsion containing 2-[2-(1-cyclohexyl-3,5-diphenyl-2-pyrrolyl)vinyl]-1,3-diethylimidazo[4,5-b]quinoxalinium salt.

21. A direct positive photographic emulsion comprising grains having a water-insoluble silver salt center, and an outer shell composed of a fogged water-insoluble silver salt that develops to silver without exposure, said emulsion containing 2-[2-(1-cyclohexyl-3,5-diphenyl-2-pyrrolyl)vinyl]-1,3,3-trimethyl-3H-pyrrolo[2,3-b]pyridinium salt.

22. A direct positive photographic emulsion comprising grains having a water-insoluble silver salt center, and an outer shell composed of a fogged water-insoluble silver salt that develops to silver without exposure, said emulsion containing 2-[2-(1-cyclohexyl-2,4-diphenyl-3-pyrrolyl)-vinyl]-1,3-diethylimidazo[4,5-b]quinoxalinium salt.

23. A photographic element comprising a support having coated thereon a direct positive photographic emulsion comprising grains having a water-insoluble silver salt center, and an outer shell composed of a fogged water-insoluble silver salt that develops to silver without exposure, said emulsion containing a cyanine dye having one of the following formulas:

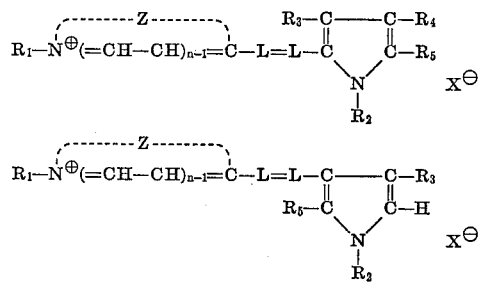

wherein $n$ represents a positive integer of from 1 to 2; L represents a methine linkage; $R_1$ represents a member selected from the group consisting of an alkyl group, an alkenyl group and an aryl group; $R_2$ represents a cyclohexyl group; $R_3$, $R_4$ and $R_5$ each represents a member selected from the group consisting of a hydrogen atom, an alkyl group, and an aryl group; X represents an acid anion; and Z represents the non-metallic atoms required to complete a 5- to 6-membered nitrogen containing desensitizing nucleus.

References Cited

UNITED STATES PATENTS 2,503,775   4/1950   Sprague _____ 96—106X

NORMAN G. TORCHIN, Primary Examiner

R. E. FICHTER, Assistant Examiner

U.S. Cl. X.R.

96—101, 106, 260—240